United States Patent
He et al.

(10) Patent No.: US 11,326,229 B2
(45) Date of Patent: May 10, 2022

(54) MONATOMIC AMORPHOUS PALLADIUM, A METHOD FOR PREPARING THE SAME AND USE THEREOF

(71) Applicant: SOUTH UNIVERSITY OF SCIENCE AND TECHNOLOGY OF CHINA, Guangdong (CN)

(72) Inventors: Jiaqing He, Guangdong (CN); Dongsheng He, Guangdong (CN); Yi Huang, Guangdong (CN); Yi Zhou, Guangdong (CN)

(73) Assignee: SOUTH UNIVERSITY OF SCIENCE AND TECHNOLOGY OF CHINA, Shenzhen (CN)

( * ) Notice: Subject to any disclaimer, the term of this patent is extended or adjusted under 35 U.S.C. 154(b) by 212 days.

(21) Appl. No.: 16/477,483

(22) PCT Filed: Feb. 27, 2018

(86) PCT No.: PCT/CN2018/077421
§ 371 (c)(1),
(2) Date: Jul. 11, 2019

(87) PCT Pub. No.: WO2019/165579
PCT Pub. Date: Sep. 6, 2019

(65) Prior Publication Data
US 2020/0248282 A1   Aug. 6, 2020

(51) Int. Cl.
*C22B 11/00* (2006.01)
*C22F 1/14* (2006.01)

(52) U.S. Cl.
CPC ............ *C22B 11/00* (2013.01); *C22F 1/14* (2013.01)

(58) Field of Classification Search
CPC ... C22B 11/00; C22F 1/14; B22F 1/00; C22C 45/00; C01G 55/00
(Continued)

(56) References Cited

U.S. PATENT DOCUMENTS

| | | | |
|---|---|---|---|
| 3,856,513 A * | 12/1974 | Chen | C22C 27/06 148/403 |
| 4,996,116 A * | 2/1991 | Webster | B32B 15/018 428/627 |
| 6,214,754 B1 * | 4/2001 | Stein | C03C 8/02 252/512 |

FOREIGN PATENT DOCUMENTS

| | | |
|---|---|---|
| CN | 101816915 | 9/2010 |
| CN | 103153502 | 6/2013 |

(Continued)

OTHER PUBLICATIONS

Zhang Tao et al., Palladium monatomic catalyst, preparation of palladium monatomic catalyst and application of palladium monatomic catalyst in acetylene hydrogenation reaction, Jun. 10, 2015, English machine translation of CN104689816A (Year: 2015).*

(Continued)

*Primary Examiner* — Anthony J Zimmer
*Assistant Examiner* — Jacob J Gusewelle
(74) *Attorney, Agent, or Firm* — Hodgson Russ LLP

(57) ABSTRACT

Provided is a monatomic amorphous palladium, a method for preparing the same and use thereof. The method comprises a) loading a monatomic palladium powder on a silicon nitride substrate; b) heating the silicon nitride substrate loaded with the monatomic palladium powder obtained in a) up to a temperature of 800° C. to 1000° C. and keeping the temperature for at least 3 minutes; and c) cooling a system of palladium and silicon nitride obtained in b) to room temperature at an apparent cooling rate greater than $10^{3\circ}$ C./second, thus obtaining the monatomic amorphous palladium.

4 Claims, 1 Drawing Sheet

(58) Field of Classification Search
USPC .................................................. 75/361, 362
See application file for complete search history.

(56) References Cited

FOREIGN PATENT DOCUMENTS

| CN | 104689816 A | * | 6/2015 | ............. Y02P 20/52 |
|---|---|---|---|---|
| CN | 106673077 | | 5/2017 | |
| CN | 108425080 | | 8/2018 | |
| JP | 2002105609 | | 4/2002 | |

OTHER PUBLICATIONS

Lu et al., Synthesis and Characterization of Crystalline and Amorphous Palladium Nanoparticles, American Chemical Society, Jun. 11, 2003, p. 5887-5891 (Year: 2003).*

Hata et al., Behavior of joining interface between thin film metallic glass and silicon nitride at heating, 2008, Materials Science and Engineering B, 149-153 (Year: 2008).*

Duwez et al., Amorphous Phase in Palladium-Silicon Alloys, 1965, Journal of Applied Physics, 2267-2269 (Year: 1965).*

Palladium-Silicon Alloys, Platinum Metals Rev., 1972, 16, (2), 49 (Year: 1972).*

* cited by examiner

MONATOMIC AMORPHOUS PALLADIUM, A METHOD FOR PREPARING THE SAME AND USE THEREOF

CROSS-REFERENCE TO RELATED APPLICATION

This application is a U.S. national phase application of International Application No. PCT/CN2018/077421, filed Feb. 27, 2018, the entire disclosure of which is incorporated herein by reference.

FIELD

The present disclosure relates to the field of amorphous materials, in particular to monatomic amorphous palladium, a method for preparing the same and use thereof.

BACKGROUND

An amorphous solid material is a condensed material characterized by short-range order, long-range disorder and no defects inside. Traditional methods for preparing amorphous solid mainly include rapid quenching and vapour-condensation techniques. For the rapid quenching method, the mixture containing required components is molten to a liquid followed by quickly quenching via some processes such that a disordered structure of the liquid is retained, thus forming the amorphous solid. For the vapour-condensation method, atoms or ions are dissociated from the liquid phase of material and rapidly deposited irregularly on a cold surface via different techniques, thus forming the amorphous solid.

In the field of amorphous materials, the preparation of pure monatomic amorphous material has been one of the most challenging problems in aspect of materials and condensed matter physics. At present, monatomic amorphous solid is mainly prepared by the rapid quenching method. For example, Kim et al. found that 50% of pure spherical metal Ferrum (Fe) droplets in a diameter of about 30 nm are formed into amorphous solids under a cooling rate of $10^7$ K $s^{-1}$, based on which they believe body-centered cubic metal has stronger amorphous forming ability than face-centered cubic metal. Further, Kim et al. also found that inhibition of formation or growth of crystal nucleus when the molten material is rapidly quenched contributes to forming pure monatomic amorphous metal. Besides, monatomic amorphous Ge metal has been obtained by Angell et al. by rapidly cooling molten Ge at a high pressure of about 10 GPa via a high-pressure quenching method. Moreover, the preparation of pure amorphous nano-metal is observed in situ by Mao et al. by building a nano-bridge of Tantalum (Ta) under the transmission electron microscope, melting the nano-metal in the middle of the bridge with a nanosecond electric pulse method and rapidly quenching the molten metal into an amorphous matter at a cooling rate of $10^{14}$ K/s.

Despite successful preparation of pure amorphous body-centered cubic metals (such as Tantalum (Ta), wolfram (W), Vanadium (V), molybdenum (Mo) and the like) with the rapid quenching method, high cooling rate for the method and limited size for material are required. Further, only nickel (Ni) among pure face-centered cubic metals is prepared to be amorphous successfully. Thus, the discovery of new monatomic amorphous materials and the optimization of process for preparing monatomic amorphous solid are still challenges in the field of amorphous materials.

SUMMARY

Embodiments of the present disclosure aim at solving at least one of the problems existing in the related art. For this, one purpose of the present disclosure is to provide a monatomic amorphous palladium, a method for preparing the same and use thereof. According to the present method, the monatomic amorphous palladium can be prepared at a lower cooling rate, and further the obtained monatomic amorphous palladium is not only capable of providing guidance for better investigation of physical properties of metallic glass (such as rheological property, mechanical property, electrical property, thermal property and the like) but also in high stability, because of the single component contained and thus lack of multiple components-caused complexity. Furthermore, such the monatomic amorphous palladium has a promising prospect in the field of hydrogen storage, hydrogen separation membrane and the like.

In one aspect, the present disclosure in embodiments provides a method for preparing a monatomic amorphous palladium.

According to some embodiments of the present disclosure, the method includes:

a) loading a monatomic palladium powder on a silicon nitride substrate;

b) heating the silicon nitride substrate loaded with the monatomic palladium powder obtained in a) up to a temperature of 800° C. to 1000° C. and keeping the temperature for at least 3 minutes; and c) cooling a system of palladium and silicon nitride obtained in b) to room temperature at an apparent cooling rate greater than 10° C./second, thus obtaining the monatomic amorphous palladium.

According to the method in embodiments of the present disclosure, the monatomic amorphous palladium can be prepared at a lower cooling rate, and further the obtained monatomic amorphous palladium is not only capable of providing guidance for better investigation of physical properties of metallic glass (such as rheological property, mechanical property, electrical property, thermal property and the like) but also in high stability, because of the single component contained and thus lack of multiple components-caused complexity. Furthermore, such the monatomic amorphous palladium has a promising prospect in the field of hydrogen storage, hydrogen separation membrane and the like.

In addition, the method for preparing the monatomic amorphous palladium according to the embodiment above may have the following additional technical features.

In some embodiments, the monatomic palladium powder in a) is of a face-centered cubic crystal structure. Therefore, it is possible to use the metal palladium with the face-centered cubic structure as an initial phase to prepare the monatomic amorphous palladium in high stability.

In some embodiments, in b), the silicon nitride ($Si_3N_4$) substrate loaded with the monatomic palladium powder obtained in a) is heated up to a temperature of 800° C. and kept at 800° C. for at least 3 minutes.

In another aspect, the present disclosure in embodiments provides a monatomic amorphous palladium.

According to some embodiments of the present disclosure, the monatomic amorphous palladium is prepared by the method described above. Thus, the obtained monatomic amorphous palladium is not only capable of providing guidance for better investigation of physical properties of metallic glass (such as rheological property, mechanical property, electrical property, thermal property and the like)

but also in high stability, because of the single component contained and thus lack of multiple components-caused complexity. Furthermore, such the monatomic amorphous palladium has a promising prospect in the field of hydrogen storage, hydrogen separation membrane and the like.

In a further aspect, the present disclosure in embodiments provides use of the monatomic amorphous palladium described above for hydrogen storage or hydrogen separation.

Additional aspects of the present disclosure and advantages thereof will be set forth and will become apparent partly in the following description or may be understood by practice of the present disclosure.

BRIEF DESCRIPTION OF THE DRAWINGS

The above and additional aspects of the present disclosure and advantages thereof will become apparent and easily understood by combining the following figures and examples of the present application, in which.

DETAILED DESCRIPTION

Figure 1:
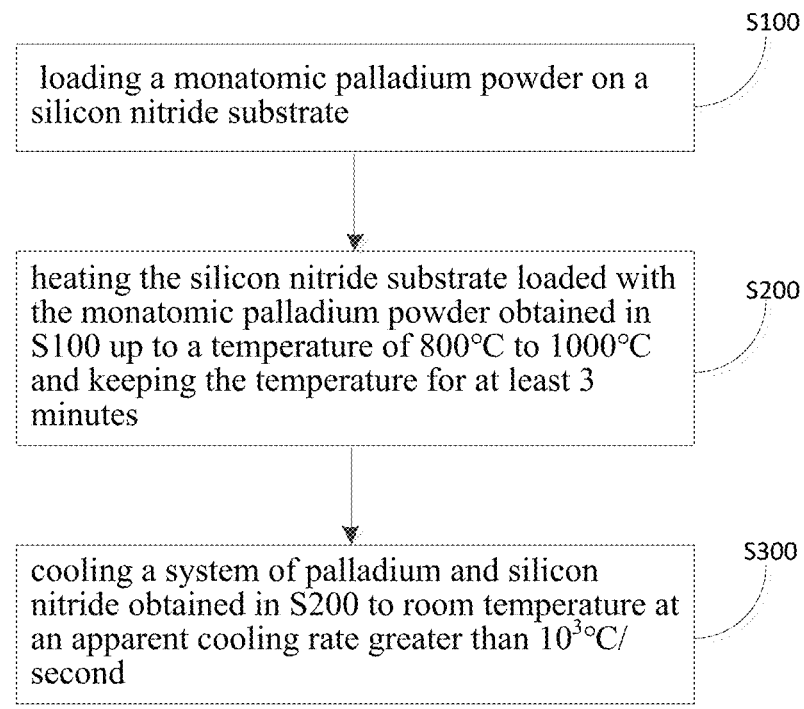
FIG. 1 is a schematic flow chart of a method for preparing monatomic amorphous palladium according to one embodiment of the present disclosure.

The embodiments of the present disclosure are described in detail below, and the examples of the embodiments are illustrated in the drawings, where the same or similar elements and the elements having same or similar functions are denoted by like reference numerals throughout the descriptions. The embodiments described herein with reference to drawings are explanatory and used to generally understand the present disclosure. The embodiments shall not be construed to limit the present disclosure.

In one aspect of the present disclosure, provided in embodiments is a method for preparing monatomic amorphous palladium. According to one embodiment of the present disclosure, referring to FIG. 1, the method includes steps as follows.

In step S100, a monatomic palladium powder is loaded on a silicon nitride substrate. In this step, the monatomic palladium powder with the face-centered cubic crystal structure may be commercially available or synthesized by physicochemical methods. For example, the monatomic palladium powder with the face-centered cubic crystal structure may be prepared by the following steps. Specifically, 0.1050 g polyvinyl pyrrolidone (PVP), 0.0600 g citric acid and 0.0600 g L-ascorbic acid are dissolved with 8 mL deionized water at room temperature, followed by transferring to a three-necked flask, heating to 120° C. and keeping the temperature for 5 minutes. Then, 0.0650 g of $K_2PdCl_4$ weighed was dissolved in 3 mL deionized water at room temperature, and injected into the three-necked flask with the aqueous mixture at a rate of 360 mL/h, with subsequent reaction at 120° C. for 3 hours. After that, the resulting product was washed with acetone and deionized water respectively to remove the residual PVP, thus obtaining the monatomic palladium powder with the face-centered cubic crystal structure.

Further, loading the monatomic palladium powder with the face-centered cubic crystal structure on a silicon nitride substrate can be conducted by dispersing a mixture of the obtained monatomic palladium powder and ethanol ($C_2H_5OH$) under ultrasonic treatment thus obtaining a dispersion, followed by loading the dispersion on a silicon nitride ($Si_3N_4$) substrate. Particularly, the dispersion is distributed on the silicon nitride ($Si_3N_4$) substrate. It should be noted, the mixing ratio of the monatomic palladium powder to ethanol ($C_2H_5OH$) and the time of ultrasonic treatment during the dispersing process are not particularly limited and can be chosen by a person skilled in the art as required.

In step S200, the silicon nitride substrate loaded with the monatomic palladium powder obtained in step S100 is heated up to a temperature of 800 to 1000° C. and kept at the temperature for at least 3 minutes.

In this step, the silicon nitride ($Si_3N_4$) substrate loaded with the monatomic palladium powder obtained in step S100 is heated up to a temperature of 800 to 1000° C. and kept at the temperature for at least 3 minutes. Specifically, the molten nano-palladium powder and the silicon in the silicon nitride substrate are subjected to eutectic melting and the resulting co-melt of palladium and silicon reaches to an equilibrium state after kept at such the temperature for a time period. According to one embodiment of the present disclosure, the silicon nitride substrate loaded with the monatomic palladium powder obtained in step S100 is preferably heated to 800° C. and kept at 800° C. for at least 3 minutes.

In step S300, a system of palladium and silicon nitride obtained in step S200 is cooled down to room temperature at an apparent cooling rate greater than $10^{3}$° C./second.

In this step, a system of palladium and silicon nitride obtained in step S200 is cooled down to room temperature at an apparent cooling rate greater than $10^{3}$° C./second, thus obtaining the monatomic amorphous palladium. Specifically, when the system is cooled at such the cooling rate, silicon in the co-melt of palladium and silicon is firstly leached out and the palladium subsequently solidifies due to the rapid decrease of the temperature. Preferably, the system of palladium and silicon nitride obtained in the step S200 is cooled down to room temperature at an apparent cooling rate of 1100° C./second.

According to the method in embodiments of the present disclosure, the monatomic amorphous palladium can be prepared at a lower cooling rate, and further the obtained monatomic amorphous palladium is not only capable of providing guidance for better investigation of physical properties of metallic glass (such as rheological property, mechanical property, electrical property, thermal property and the like) but also in high stability, because of the single component contained and thus lack of multiple components-caused complexity. Furthermore, such the monatomic amorphous palladium has a promising prospect in the field of hydrogen storage, hydrogen separation membrane and the like.

At the same time, the present disclosure has the following advantages compared with the prior art.

First, new monatomic amorphous palladium, never reported in the prior art before the present disclosure, has been firstly prepared with a heating/cooling process, where such the amorphous palladium has an initial phase of the face-centered cubic structure.

Second, the present monatomic amorphous palladium can be formed by cooling at an apparent cooling rate of 1000° C./second, which is significantly lower than that required in traditional preparation methods reported in the prior art, and such the monatomic amorphous palladium prepared is in high stability.

Third, the present monatomic amorphous palladium can be used in technologies of hydrogen storage or hydrogen separation membrane.

In still another aspect, the present disclosure in embodiments provides a monatomic amorphous palladium. According to one embodiment of the present disclosure, the monatomic amorphous palladium is prepared by the method described above. Thus, the obtained monatomic amorphous palladium is not only capable of providing guidance for better investigation of physical properties of metallic glass (such as rheological property, mechanical property, electrical property, thermal property and the like) but also in high stability, because of the single component contained and thus lack of multiple components-caused complexity. Furthermore, such the monatomic amorphous palladium has a promising prospect in the field of hydrogen storage, hydrogen separation membrane and the like. It should be noted, the features and advantages described above for the method of preparing the monatomic amorphous palladium are also applicable to the monatomic amorphous palladium, which will not be repeated herein.

In a further aspect, the present disclosure in embodiments provides use of the monatomic amorphous palladium described above for hydrogen storage or hydrogen separation. Specifically, the monatomic amorphous palladium can be used in technologies of hydrogen storage or hydrogen separation membrane. It should be noted, the features and advantages described above for the monatomic amorphous palladium are also applicable to the use of the monatomic amorphous palladium in hydrogen storage or hydrogen separation, which will not be repeated herein.

The present disclosure is described below with reference to the specific example, which is intended to be illustrative and not to limit the present disclosure in any way.

Figure 2:
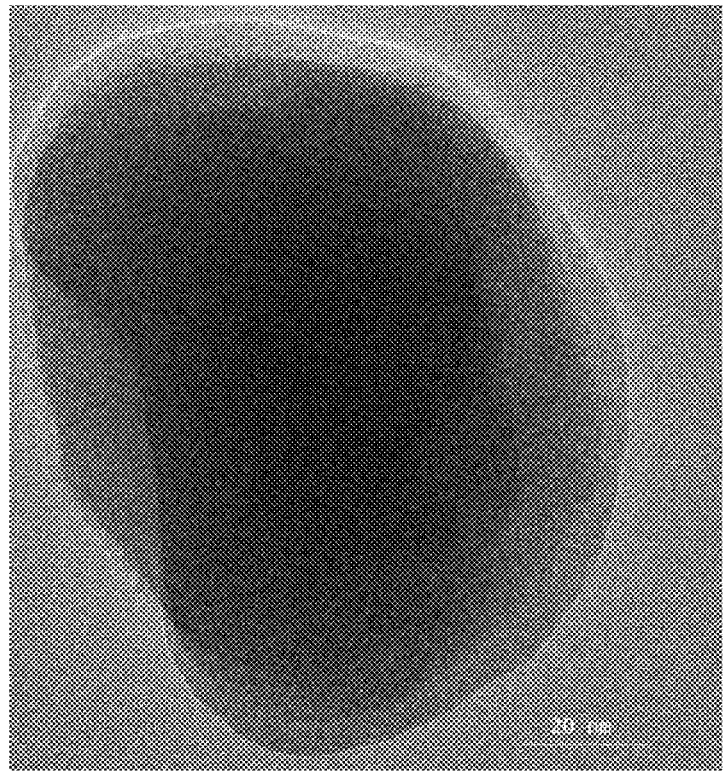
FIG. 2 is an electron micrograph of a monatomic amorphous palladium obtained by the method for preparing monatomic amorphous palladium according to one embodiment of the present disclosure.

EXAMPLE 0.1050 g polyvinyl pyrrolidone (PVP), 0.0600 g citric acid and 0.0600 g L-ascorbic acid were dissolved with 8 mL deionized water at room temperature, followed by transferring to a three-necked flask, heating to 120° C. and keeping the temperature for 5 minutes. Then, 0.0650 g of $K_2PdCl_4$ weighed was dissolved in 3 mL deionized water at room temperature, and injected into the three-necked flask with the aqueous mixture at a rate of 360 mL/h, with subsequent reaction at 120° C. for 3 hours. After that, the resulting product was washed with acetone and deionized water respectively to remove the residual PVP, thus obtaining the monatomic palladium powder with the face-centered cubic crystal structure. Subsequently, a mixture of the obtained monatomic palladium powder and ethanol was dispersed under ultrasonic treatment for 15 minutes thus obtaining a dispersion, followed by distributing the dispersion on the NanoEx-i-v MEMS chip (Thermo Fisher Company) with a pipettor. The chip was then heated up to a temperature of 800° C. and kept at such the temperature for 5 minutes, and then rapidly cooled down to room temperature at an apparent cooling rate of 1100° C./second, thus obtaining the monatomic amorphous palladium. Its electron micrograph is shown in FIG. 2.

Although explanatory embodiments have been shown and described above, it would be appreciated by those skilled in the art that the details in the above embodiments cannot be construed to limit the present disclosure, and changes, alternatives and modifications can be made in the embodiments without departing from spirit, principles and scope of the present disclosure.

Further, the particular features described in explanatory embodiments above may be combined in any suitable manner without contradictory. To avoid unnecessary repetition, various possible combinations of the present disclosure will not be described separately.

In addition, any combination of various embodiments of the present disclosure may be made only if it does not deviate from the spirit of the present disclosure, and it should be regarded as the scope of the present disclosure.

Throughout this specification, reference to "an embodiment", "some embodiments", "one embodiment", "another example", "an example", "a specific example" or "some examples" mean that a particular feature, structure, material or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example" or "in some examples" in various places throughout this specification are not necessarily referring to the same embodiment or example of the present disclosure. Furthermore, the particular features, structures, materials or characteristics may be combined in any suitable manner in one or more embodiments or examples. In addition, it will be apparent to those skilled in the art that different embodiments or examples as well as features of the different embodiments or examples described in this specification may be combined without contradictory.

Although the embodiments of the present disclosure have been shown and described, it is understood that the above-described embodiments are illustrative and are not to be construed as limiting the scope of the present disclosure. The embodiments are subject to variations, modifications, substitutions and variations.

What is claimed is:

1. A method for preparing a monatomic amorphous palladium, comprising:
   a) loading a monatomic palladium powder on a silicon nitride substrate;
   b) heating the silicon nitride substrate loaded with the monatomic palladium powder obtained in a) up to a temperature of 800° C. to 1000° C. and keeping the temperature for at least 3 minutes; and
   c) cooling a system of palladium and silicon nitride obtained in b) to room temperature at an apparent cooling rate greater than $10^3$° C./second, thus obtaining the monatomic amorphous palladium.

2. The method according to claim 1, wherein the monatomic palladium powder in a) is of a face-centered cubic crystal structure.

3. The method according to claim 1, wherein in b), the silicon nitride substrate loaded with the monatomic palladium powder obtained in a) is heated up to a temperature of 800° C. and kept at 800° C. for at least 3 minutes.

4. The method according to claim 2, wherein in b), the silicon nitride substrate loaded with the monatomic palladium powder obtained in a) is heated up to a temperature of 800° C. and kept at 800° C. for at least 3 minutes.

* * * * *